(12) United States Patent
Aweya et al.

(10) Patent No.: US 6,894,832 B1
(45) Date of Patent: May 17, 2005

(54) TECHNIQUE FOR ADAPTIVELY CONTROLLING GAIN IN AN OPTICAL AMPLIFIER

(75) Inventors: James Aweya, Kanata (CA); Delfin Y. Montuno, Kanata (CA); Michel Ouellette, Plantagenet (CA); Kent Felske, Kanata (CA)

(73) Assignee: Nortel Networks Limited, St. Laurent (CA)

( * ) Notice: Subject to any disclaimer, the term of this patent is extended or adjusted under 35 U.S.C. 154(b) by 370 days.

(21) Appl. No.: 10/231,090

(22) Filed: Aug. 30, 2002

(51) Int. Cl.[7] .............................................. H01S 3/00
(52) U.S. Cl. .............................. 359/341.41; 359/341.43
(58) Field of Search ......................... 359/341.41, 341.43

(56) References Cited

U.S. PATENT DOCUMENTS

| | | | | |
|---|---|---|---|---|
| 6,246,514 B1 | * | 6/2001 | Bonnedal et al. | 359/341.41 |
| 6,366,393 B1 | * | 4/2002 | Feulner et al. | 359/337 |
| 6,678,088 B1 | * | 1/2004 | Stummer et al. | 359/341.41 |
| 6,757,099 B2 | * | 6/2004 | Pavel et al. | 359/341.4 |
| 6,762,878 B2 | * | 7/2004 | Park et al. | 359/341.42 |

FOREIGN PATENT DOCUMENTS

WO   WO 98/06191   *   2/1998

OTHER PUBLICATIONS

M. Zirngibl, "Gain control in erbium–doped fiber amplifiers by an all–optical feedback loop," Electron. Lett., vol. 27, No. 7, 1991, pp. 560–561.

E. Delevaque et al., "Gain control in erbium–doped fibre amplifiers by lasing at 1480nm with photoinduced bragg gratings written in fibre ends," Electron. Lett., vol. 29, 1993, pp. 1112–1113.

B. Landousies, T. Georges, E. Delevaque, R. Lebref, and M Monerie, "Low power transients in multichannel equalised and stabilised gain amplifier using passive gain control," Electron. Lett., vol. 32, 1996, pp. 1912–1913.

J.L. Zyskind, A. K. Srivastava, Y. Sun, J.C. Ellison, G. W. Newsome, R. W. Tkach, A.R. Chraplyvy, J.W. Sulhoff, T.A. Strasser, J.R. Pedrazzani, and C. Wolf, "Fast link control protection for surviving channels in multiwavelength optical networks," $22^{nd}$ European Conf. on Optical Commun. ECOC'96, Oslo, Norway, 1996, ThC.3.6, pp. 5.49–5.52.

F. Shehadeh, R.S. Vodhanel, C. Gibbons, and M. Ali, "Comparison of gain control techiques to stabilize EDFA's for WDM networks," OFC '96 Technical Digest, pp. 190–191.

J. L. Jackel and D. Richards, "All–optical stabilization of cascaded multichannel erbium–doped fiber amplifiers with changing numbers of channels," OFC '97 Technical Digest, pp. 84–85.

A. K. Srivastava, et al., "EDFA Transient Response to Channel Loss in WDM Transmission System," IEEE Photonics Technology Letters, vol. 9, No. 3, Mar. 1997, pp. 386–388.

Y. Sun et al., "Fast power transients in WDM optical networks with cascaded EDFAs," Electronics Letters, $13^{th}$Feb. 1997, vol. 33, No. 4, pp. 313–314.

* cited by examiner

Primary Examiner—Mark Hellner
(74) Attorney, Agent, or Firm—Hunton & Williams LLP (57) ABSTRACT

A technique for adaptively controlling a gain of an optical amplifier is disclosed. In one particular exemplary embodiment, the technique may be realized by a method comprising the steps of measuring an output power signal of the optical amplifier; computing a command signal from an input power signal; computing a model state signal of a reference model; computing a model output signal of the reference model based at least in part on the model state signal; computing an error signal between the model output signal and the output power signal of the optical amplifier; adjusting at least one adaptive control gain value to minimize the error signal; and computing a control input signal for driving the optical amplifier based at least in part on the at least one adaptive control gain value, the error signal, the model state signal and the command signal.

20 Claims, 4 Drawing Sheets

TECHNIQUE FOR ADAPTIVELY CONTROLLING GAIN IN AN OPTICAL AMPLIFIER

FIELD OF THE INVENTION

The present invention relates generally to controlling an optical amplifier and, more particularly, to a technique for adaptively controlling gain in an optical amplifier, such as an erbium-doped fiber amplifier.

BACKGROUND OF THE INVENTION

One major problem facing optical networks based on wavelength Division Multiplexed (WDM) technologies with fiber amplifiers is power transients. Power transients can arise from a number of sources and generally refer to a change in power of a subset of wavelength channels propagating through a system. Power transients can occur due to planned or unplanned transient events in an optical network. These events may include changes in a number of wavelength channels and transient/permanent deformation of a fiber (e.g., connector pull, fiber bend, fiber cut, amplifier failure, signal laser failure, etc.).

A number of wavelength-multiplexed channels traversing an erbium-doped fiber amplifier (EDFA) in a multi-wavelength network may change as a result of network configuration, network growth, or network faults. EDFAs are generally operated near gain saturation where a total output power at saturation is very nearly constant, independent of the number of channels. All channels present are amplified simultaneously by an amplifier and must share the available saturated gain. An output power of each channel will, therefore, depend on the number of channels present. Channel count changes will induce transients in the gain at other wavelengths, via transient cross-saturation in the amplifier. System performance may be degraded by fiber nonlinearity when channel powers are too high. Loss of channels can give rise to surviving channel errors (erg., increased bit error rates) since the power of the surviving channels may surpass thresholds at which system nonlinearities become significant. Addition of channels can cause similar errors by depressing the power of the surviving channels below a receiver sensitivity. Performance degradation may occur due to small receiver signal-to-noise ratio (SNR) when channel powers are too low.

Signal power fluctuations may also occur due to span loss variations or random polarization changes. Unplanned transient events such as those due to failure or accidental handling of optical fiber (e.g., connector pull, fiber bend, fiber cut, amplifier failure, etc.) may result in complete failure loss of an optical signal and/or a reduction of power in a fiber.

Essentially, power excursions due to planned or unplanned transient events may cause power of other channels propagating through a given EDFA to change, which in turn may cause errors or even damage to a receiver. Thus, EDFAs require effective gain control mechanisms in order to limit effects of power excursions in a network. Also, since these power excursions increase with the number of EDFAs (e.g., signal degradations may accumulate along an amplifier chain) and seriously degrade transmission performance, gain control of EDFAs is a key requirement for achieving reliable WDM networks. Cross-saturation in a network with a chain of EDFAs may induce power transients to surviving channels at a speed which is proportional to a number of amplifiers in the chain. While typical time scales for gain changes in a single amplifier are tens of microseconds, a time constant for a chain of N amplifiers is 1/N times shorter than that of a single amplifier. Thus long chains of amplifiers will require faster control to limit undesirable power excursions, presenting a greater stabilization challenge.

Several automatic (or dynamic) gain control schemes have been proposed to suppress power transients. These include gain clamping by an all-optical feedback loop, fast pump control, and fast link control by insertion of a control channel.

In an all-optical gain clamping method, a portion of an amplifier (e.g., EDFA) output is tapped off, filtered by a band pass filter, and fed back into the amplifier. The gain of a loop is controlled by using an attenuator in the loop. This feedback loop causes the amplifier to lase at a wavelength passed by the filter in the loop. This has the effect of clamping an amplifier gain seen by other wavelengths to a fixed value, irrespective of an input signal power.

Fast pump control has been shown to limit power excursions of surviving channels and protect surviving channels against fast power transients. In a fast pump control method, a simple automatic gain control (AGC) circuit monitors an input power into an amplifier and adjusts a pump power to vary a gain if the input power changes. The response time of this method is limited ultimately by the lifetime of electrons from the third energy level to the second energy level in Erbium which is around 1 As.

In a fast link control method, an additional wavelength is introduced on a link to act as a compensating wavelength. The compensating wavelength is introduced at a beginning of the link and tapped off at an end of the link. The power on the compensating wavelength is increased to compensate for any decrease in power seen at the input to the link.

Proportional integral (PI) controllers are conventionally used with feedback control for controlling power gain of an optical amplifier and to eliminate disturbances. PI controllers require a linear mathematical model of a process, which is typically developed using a priori information of the process. However, PI controllers are not suitable for processes with time-varying parameters and nonlinear processes.

Some PI controllers have been enhanced with a feed-forward control loop. With this enhancement, it is possible, in some situations, to measure disturbances before they have influence on the process. In this case, the effects of the disturbances can be eliminated before control errors are created. Feed-forward control, however, requires a precise mathematical model of a process and is typically much more sensitive to modeling errors than a simple feedback control scheme.

An optical amplifier may be used to compensate for intensity loss in fiber and network elements. Optical amplifiers may operate in saturated mode and cause a cross-saturation effect on surviving channels when a number of supported channels is changed due to link reconfiguration or failure thereby creating signal power transient in surviving channels. To maintain quality of an optical signal, power gain of an optical amplifier must be properly controlled to eliminate channel errors caused by surviving channel signal power transients.

In view of the foregoing, it would be desirable to provide a technique for adaptively controlling gain in an optical amplifier which overcomes the above-described inadequacies and shortcomings. More particularly, it would be desirable to provide a technique for adaptively controlling gain in an optical amplifier in an efficient and cost effective manner.

SUMMARY OF THE INVENTION

According to the present invention, a technique for adaptively controlling gain in an optical amplifier is provided. In one particular exemplary embodiment, the technique may be realized by a method for adaptively controlling a gain of an optical amplifier comprising the steps of measuring an output power signal of the optical amplifier; computing a command signal from an input power signal; computing a model state signal of a reference model; computing a model output signal of the reference model based at least in part on the model state signal; computing an error signal between the model output signal and the output power signal of the optical amplifier; adjusting at least one adaptive control gain value to minimize the error signal; and computing a control input signal for driving the optical amplifier based at least in part on the at least one adaptive control gain value, the error signal, the model state signal and the command signal.

In accordance with other aspects of this particular exemplary embodiment of the present invention, the reference model is a low pass filter; the command signal comprises a product of an input power signal and a target gain plus a bias signal; the command signal comprises a product of a target gain and a sum of the input power signal and a bias signal; the optical amplifier comprises a pump laser and an erbium-doped fiber; the at least one adaptive control gain value comprises a first gain value associated with the error signal, a second gain value associated with the model state signal and a third gain value associated with the command signal; each adaptive control gain value comprises an integral component and a proportional component; and the control input signal comprises a first product of a first adaptive control gain value and the error signal, a second product of a second adaptive control gain value and the model state signal; and a third product of a third adaptive control gain value and the command signal.

According to another particular exemplary embodiment, a computer signal embodied in a carrier wave readable by a computing system and encoding a computer program of instructions for executing a computer process performing the method recited above.

According to another particular exemplary embodiment, a system: for adaptively controlling a gain of an optical amplifier comprises a reference model for generating a model output signal based at least in part on a model state signal; a first summer for computing an error signal between the model output signal and an output power signal from the optical amplifier; an adaptation mechanism for adjusting at least one adaptive control gain value to minimize the error signal; and a second summer for computing a control input signal for driving the optical amplifier based at least in part on the at least one adaptive control gain value, the error signal, the model state signal and a command signal computed from an input power signal.

In accordance with other aspects of this particular exemplary embodiment of the present invention, the reference model is a low pass filter; the command signal comprises a product of an input power signal and a target gain plus a bias signal; the command signal comprises a product of a target gaih and a sum of the input power signal and a bias signal; the optical amplifier comprises a pump laser and an erbium-doped fiber; the at least one adaptive control gain value comprises a first gain value associated with the error signal, a second gain value associated with the model state signal and a third gain value associated with the command signal; each adaptive control gain value comprises an integral component and a proportional component; and the control input signal comprises a first product of a first adaptive control gain value and the error signal, a second product of a second adaptive control gain value and the model state signal; and a third product of a third adaptive control gain value and the command signal.

According to another particular exemplary embodiment, an article of manufacture for adaptively controlling a gain of an optical amplifier comprises at least one processor readable carrier; and instructions carried on the at least one carrier; wherein the instructions are configured to be readable from the at least one carrier by at least one processor and thereby cause the at least one processor to operate so as to: measure an output power signal of the optical amplifier; compute a command signal from an input power signal; compute a model state signal of a reference model; compute a model output signal of the reference model based at least in part on the model state signal; compute an error signal between the model output signal and the output power signal of the optical amplifier; adjust at least one adaptive control gain value to minimize the error signal; and compute a control input signal for driving the optical amplifier based at least in part on the at least one adaptive control gain value, the error signal, the model state signal and the command signal.

In accordance with other aspects of this particular exemplary embodiment of the present invention, the optical amplifier comprises a pump laser and an erbium-doped fiber; and the at least one adaptive control gain value comprises a first gain value associated with the error signal, a second gain value associated with the model state signal and a third gain value associated with the command signal.

The present invention will now be described in more detail with reference to exemplary embodiments thereof as shown in the appended drawings. While the present invention is described below with reference to preferred embodiments, it should be understood that the present invention is not limited thereto. Those of ordinary skill in the art having access to the teachings herein will recognize additional implementations, modifications, and embodiments, as well as other fields of use, which are within the scope of the present invention as disclosed and claimed herein, and with respect to which the present invention could be of significant utility.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENT(S)

For optimal performance, erbium-doped fiber amplifiers (EDFAs) are typically operated in a gain-saturated regime. However, system performance may be critically affected by wavelength channel count changes or power changes in a subset of the channels since all channels present are amplified simultaneously and must share the available saturated gain. Channel loading changes induce power transients in each of the remaining output channels via transient cross-saturation in the amplifier. Fast gain control of the amplifier is required to maintain the gain experienced by the surviving channels as channel loading changes. Automatic (or dynamic) gain control maintains the EDFA gain at a fixed level during transient signal changes while providing gain linearization.

An aspect of the present invention is directed to a gain control scheme for an EDFA that uses an adaptive control algorithm for pump power control. The adaptive control algorithm is simple to implement, does not require explicit process parameter identification and provides effective gain transient suppression capabilities.

Figure 1:
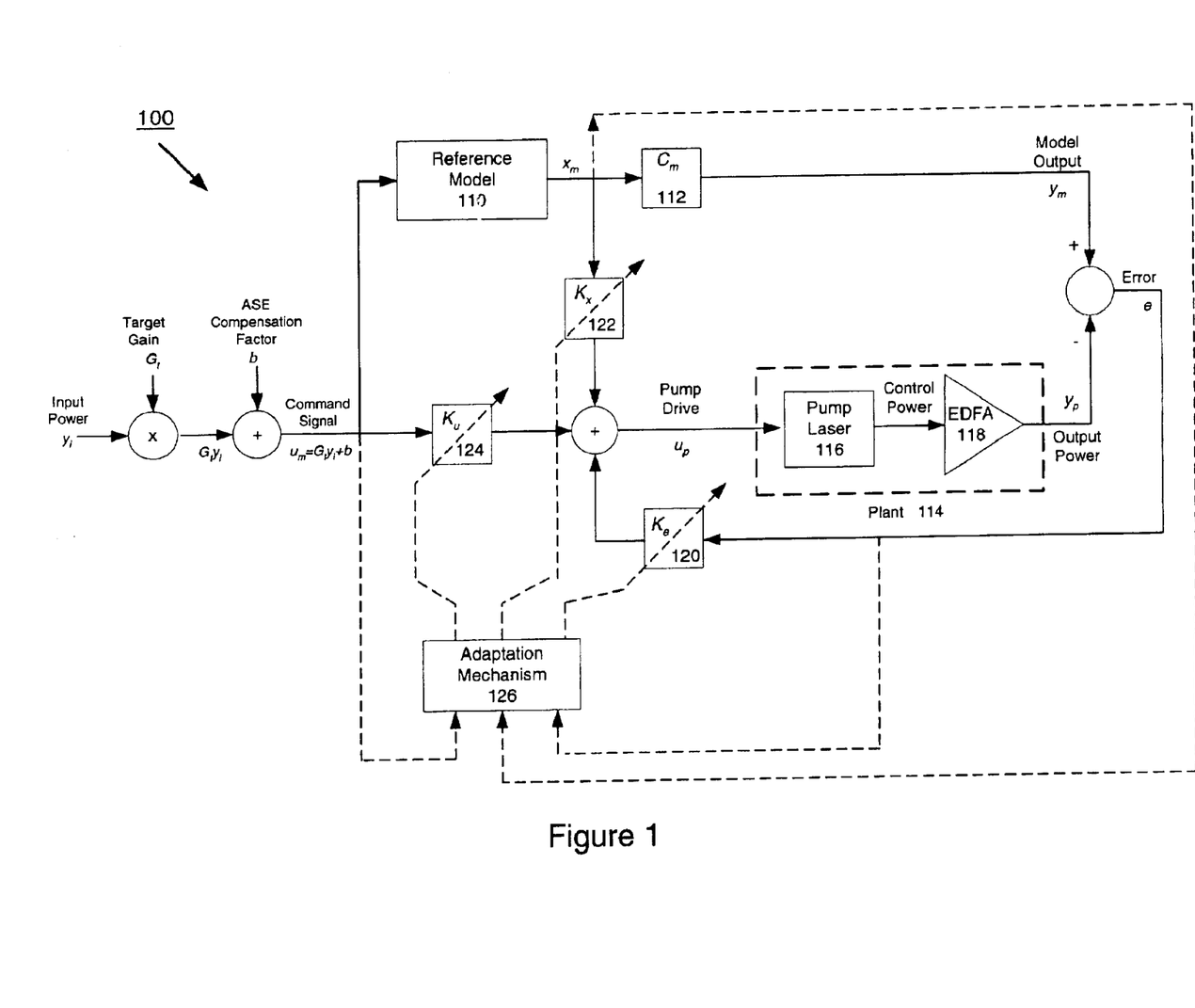
FIG. 1 illustrates an adaptive gain control scheme for an EDFA in accordance with the present invention.

FIG. 1 illustrates an adaptive gain control scheme for an EDFA in accordance with an embodiment of the present invention. In particular, a Model Reference Adaptive Control (MRAC) system may be applied to EDFA gain control. As shown in FIG. 1, reference model 110 receives command signal $u_m(t)$ and generates an output signal $x_m(t)$. The command signal $u_m(t)$ may include a combination of input power $y_i$, target gain $G_i$ and compensation factor b. A model output signal $y_m(t)$ may be generated from $C_m$ block 112. Plant 114 may include a pump laser 116 for generating a control power to drive EDFA 118. Plant 114 may receive a pump drive $u_p(t)$ and generate an output power $y_p(I)$. An error signal e(t) may be computed by subtracting $y_p(t)$ from $y_m(t)$. A goal of the system is to minimize the error signal as much as possible so that the output power signal $y_p(t)$ will follow the model output signal $y_m(t)$ Adaptive gain values $K_e$ 120, $K_x$ 122 and $K_u$ 124 may be adaptively controlled by adaptation mechanism 126. Adaptation mechanism 126 may receive inputs from one or more of output signal $x_m(t)$, error signal e(t), command signal $u_m(t)$ and other combinations thereof. The combination of adaptation gain values, command signal $u_m(t)$, output signal $x_m(t)$ and error signal e(t) may be used to compute the pump drive signal $u_p(t)$.

A MRAC system may be designed to obtain a closed-loop response performance close to a given reference model of a desired closed-loop behavior. A MRAC scheme may require a measurable external input signal or command signal $u_m(t)$, for a reference model, as illustrated by 110. The command signal $u_m(t)$ may be used to make system 100 behave in a specified way. Reference model 110 tells how a process output ideally should respond to command signal $u_m(t)$. A goal is to make the output of a plant 114 (e.g., output power $y_p(t)$) approach asymptotically the output of reference model 110 (e.g., model output signal $y_m(t)$)

Plant design specifications may be incorporated within reference model 110 such that a step input to the reference model may cause its outputs to respond with a specified rise time, overshoot, and setting time. The reference inputs are fed into the reference model, which responds in accordance with the design specifications that have been built into it. If the control system is properly designed, inputs to plant drive 114 the outputs of the plant (e.g., $y_p(t)$) to equal the outputs of the reference model (e.g., $y_m(t)$). Inputs to the plant may be generated from reference model inputs, model states, and/or an error between plant and model outputs.

Based on a desired closed loop behavior, controller parameters may be adapted in such a way that a suitable error signal e(t) (which represents a difference between a process output $y_p(t)$ and a reference model output $y_m(t)$) will be minimized. In order to diminish the error signal, a performance criterion may be defined which may be optimized analytically. The minimization, together with considerations of possible constraints and additional demands, yields an adaptation algorithm creating an adaptive system which is nonlinear and time-varying.

For practical applications, the adaptation may be divided into at least three stages including characterization of a desired behavior of a closed-loop system; calculation of a controller parameters based on an adaptation law and adjustment of the controller parameters to drive the process towards the desired behavior. The differences between the various model reference adaptive controllers are due to the design procedure of the adaptation law. The reference model may be chosen as a dynamic system of first or second order. MRAC systems provide a rapid adaptation to defined input signals and a straightforward treatment of stability using nonlinear stability theory.

One MRAC method involves a Simple Adaptive Control (SAC) procedure. A desired behavior may be defined by the output of a simulated reference model a priori designed to account for standard specifications such as overshoot, setting and rise times, as well as steady state behavior.

In the SAC method, system behavior may be evaluated by comparing a process output with an output of a reference model. This instantaneously and easily computed error or difference between the plant and model may be used in a set of easily evaluated formulas for adjusting control gains. This adaptation rule reduces an index composed of a positive weighted combination of square error signals and a positive weighted combination of differences between instantaneous gains and ideal values.

For example, a process may have the following linear process model:

$$\dot{x}_p(t) = \frac{dx_p(t)}{dt} = A_p x_p(t) + B_p u_p(t) \tag{1}$$

$$y_p(t) = C_p u_p(t)$$

where $x_m(t)$ represents a n×1 plant state vector, $u_p(t)$ represents a m×1 control vector, $y_p(t)$ represents a q×1 plant output vector, and $A_p$ and $B_p$ represent matrices with appropriate dimensions. The primary control problem considered is control of a continuous multivariable linear system subject to uncertainty in the parameters. An objective is to find, without explicit knowledge of $A_p$ and $B_p$, a control $u_p(t)$ such that a plant output vector $y_p(t)$ approximates an output of the reference model $$\dot{x}(t) = A_m x_m(t) + B_m u_m(t)$$

$$y_m(t) = C_m x_m(t) \tag{2}$$

where $x_m(t)$ represents a $n_m \times 1$ model state vector, $u_m(t)$ represents a m×1 model input or command, $y_m(t)$ represents a q×1 model output vector, and $A_m$ and $B_m$ represents matrices with appropriate dimensions. The reference model may be assumed to be bounded-input/bounded-output stable. For example, a dimension of the model state may be less than a dimension of the plant state. However, as $y_p(t)$ tracks $y_m(t)$, the number of model outputs may equal to the number of plant outputs.

According to an embodiment of the present invention, an adaptive control law used for an AGC of an EDFA may be described by the following equations:

$$r(t) = \begin{bmatrix} y_m(t) - y_p(t) \\ x_m(t) \\ u_m \end{bmatrix} = \begin{bmatrix} e(t) \\ x_m(t) \\ u_m \end{bmatrix}, \quad (3)$$

$$K_r(t) = [K_e(t) K_x(t) K_u(t)], \quad (4)$$

$$u_p(t) = K_r(t) r(t), \quad (5)$$

$$K_r(t) = K_I(t) + K_p(t), \quad (6)$$

$$\dot{K}_I(t) = e(t) r^T(t) \Phi_1 - \sigma K_I(t), \; \Phi_1 > 0, \; \sigma \geq 0 \quad (7)$$

$$K_p(t) = e(t) r^T(t) \Phi_p, \; \Phi_p \geq 0, \quad (8)$$

where $\Phi_I$ and $\Phi_p$ represent selected positive definite scaling matrices and $[\bullet]^T$ denotes a transpose of $[\bullet]$. The adaptive mechanism uses values that can be measured, e.g., $e(t)$, $x_m(t)$ and $u_m(t)$. In addition, adaptive gains $K_r(t)$ may be calculated as a combination of proportional and integral terms.

A $\sigma$-term may be introduced to avoid divergence of integral gains in the presence of disturbances. Without the $\sigma$-term, $K_I(t)$ is a perfect integrator and may steadily increase whenever perfect following (e.g., $e(t)=0$) is not possible, and may thus reach unnecessarily large values, or even diverge. With the $\sigma$-term, $K_I(t)$ may be obtained from a first order filtering of $e(t) r^T(t) \Phi_1$ and therefore cannot diverge, unless $e(t)$ diverges.

As shown in FIG. 1, an adaptive gain control scheme may be applied to an EDFA in accordance with an embodiment of the present invention. For example, a control problem may be limited to a single-input-single-output case. Other control problems may be applied in accordance with the present invention. The plant input and output are, respectively, a pump laser drive (e.g., $u_p(t)$) and an EDFA output power (e.g., $y_p(t)$). Here, a command signal $u_m(t)$ may be formulated as a product of an input power $y_i(t)$ and a target gain $G_t$ plus a bias b, i.e., $u_m(t) = G_t y_i(t) + b$. The bias b may be for ASE compensation or other compensation. According to another example, the command signal may be defined as $u_m(t) = G_t(y_i(t) + b)$. Other variations may be implemented.

For example, a simple first-order (e.g., low-pass filter with single pole) reference model may be implemented for an adaptive control scheme. In this example, the output of the EDFA (e.g., $y_p(t)$) may follow the output of the reference model (e.g., $y_m(t)$), where the reference model may comprise a first-order filter, for example, having a transfer function described as follows:

$$\frac{X_m(s)}{U_m(s)} = \frac{1}{\tau_m s + 1}, \quad (9)$$

where $X_m(s)$ and $U_m(s)$ represent Laplace transforms of $x_m(t)$ and $u_m(t)$, respectively, and $\tau_m$ represents a time constant of the reference model which may be specified. The reference model may be expressed in a continuous-time domain as $$\dot{x}_m(t) = \frac{-1}{\tau_m} x_m(t) + \frac{1}{\tau_m} u_m = A_m x_m(t) + B_m u_m(t) \quad (10)$$

$$y_m = C_m x_m(t),$$

where $A_m = -1/\tau_m$, $B_m = 1/\tau_m$, and $C_m = 1$. In this reference model, $y_m = x_m(t)$. Measurements in the control scheme may include $e(t) = y_m(t) - y_p(t)$, $x_m(t)$, and $u_m(t)$.

According to another embodiment of the present invention, the adaptive gain control algorithm may be implemented in discrete-time. In a digital implementation, control actions $u_p$ may be based on values of a process output at discrete times. A discrete-time controller may be derived based on a continuous-time design by approximating derivatives and integrals. A differential equation may be converted to a difference equation by approximating the derivative of the variable by a difference. There are simple approximation techniques for taking the differential equation, such as a forward difference (also called Euler's method) over one sample time $t_s$ $$\frac{d K_I(t)}{dt} \approx \frac{K_I((k+1)t_s) - K_I(kt_s)}{t_s}, \quad (11)$$

and a backward difference $$\frac{d K_I(t)}{dt} \approx \frac{K_I(kt_s) - K_I((k-1)t_s)}{t_s}, \quad (12)$$

where k is a positive integer. Each discrete time $kt_i$, $k=0, 1, 2, \ldots$, be represented simply as n, $n=0, 1, 2, \ldots$.

Using the forward difference approximation, an "integral" gain may be approximated by $$\frac{K_I(n+1) - K_I(n)}{t_s} = e(n) r^T(n) \Phi_I - \sigma K_I(n) \quad (13)$$

$$K_I(n+1) = (1 - \sigma t_s) K_I(n) + t_s e(n) r^T(n) \Phi_I + tm \quad (14)$$

where $$K_I(n) = [K_{Ie}(n) K_{Ix}(n) K_{Iu}(n)]. \quad (15)$$

Thus, the first term of the right hand side of equation (14) may be written as $$(1 - \sigma t_s) K_I(n) = (1 - \sigma t_s)[K_{Ie}(n) \; K_{Ix}(n) \; K_{Iu}(n)]$$
$$= [(1 - \sigma t_s) K_{Ie}(n) \; (1 - \sigma t_s) K_{Ix}(n) \; (1 - \sigma t_s) K_{Iu}(n)]$$

and the second term as $$t_s e(n) r^T(n) \Phi_I = t_s e(n) [e(n) \; x_m(n) \; u_m(n)] \begin{bmatrix} \phi_I & 0 & 0 \\ 0 & \phi_I & 0 \\ 0 & 0 & \phi_I \end{bmatrix}$$
$$= [t_s \phi_I e^2(n) \; t_s \phi_I e(n) x_m(n) \; t_s \phi_I e(n) u_m(n)]$$

Equation (14) may then be written as $$K_I(n) = [K_{Ie}(n) \; K_{Ix}(n) \; K_{Iu}(n)] \quad (16)$$
$$= \begin{bmatrix} (1 - \sigma t_s) K_{Ie}(n-1) + t_s \phi_I e^2(n-1) \\ (1 - \sigma t_s) K_{Ix}(n-1) + t_s \phi_I e(n-1) x_m(n-1) \\ (1 - \sigma t_s) K_{Iu}(n-1) + t_s \phi_I e(n-1) u_m(n-1) \end{bmatrix}^T$$

The "proportional" gain may be written in the discrete-time domain as $$K_p(n) = \lfloor K_{pe}(n) \quad K_{px}(n) \quad K_{pu}(n) \rfloor \qquad (17)$$
$$= [\phi_p e^2(n) \quad \phi_p e(n)x_m(n) \quad \phi_p e(n)u_m(n)]$$

Control gain $K_r(n)$ may be written as $$K_p(n) = K_I(t) + K_p(t) \qquad (18)$$
$$= [K_e(n) \quad K_x(n) \quad K_u(n)]$$
$$= [K_{pe}(n)+K_{le}(n) \quad K_{px}(n)+K_{lx}(n) \quad K_{pu}(n)+K_{lu}(n)]$$

From (5), the control input may be represented as $$u_p(n)=K_r(n)r(n)=K_e(n)e(n)+K_x(n)x_m(n)+K_u(n)u_m(n) \qquad (19)$$

When the backward difference is applied, equation (7) may be approximated by $$\frac{K_l(n) - K_l(n-1)}{t_s} = e(n)r^T(n)\Phi_l - \sigma K_l(n) \qquad (20)$$

$$K_l(n) = \frac{1}{(1+\sigma t_s)}[K_l(n-1)+t_s e(n)r^T(n)\Phi_l] \qquad (21)$$

Equation (21) may further be expressed as $$K_l(n) = [K_{le}(n) \quad K_{lx}(n) \quad K_{lu}(n)] \qquad (22)$$
$$= \begin{bmatrix} \frac{1}{(1+\sigma t_s)}[K_{le}(n-1)+t_s\phi_l e^2(n)] \\ \frac{1}{(1+\sigma t_s)}[K_{lx}(n-1)+t_s\phi_l e(n)x_m(n)] \\ \frac{1}{(1+\sigma t_s)}[K_{lu}(n-1)+t_s\phi_l e(n)u_m(n)] \end{bmatrix}^T$$

Using the forward difference and backward difference approximations, the reference model as described in equation (10) may be expressed, respectively, as $$y_m(n) = x_m(n) = \left[1 - \frac{t_s}{\tau_m}\right]x_m(n-1) + \frac{t_s}{\tau_m}u_m(n-1) \qquad (23)$$

and $$x_m(n) = \frac{\tau_m}{t_s + \tau_m}x_m(n-1) + \frac{t_s}{t_s + \tau_m}u_m(n). \qquad (24)$$

A sufficiently small sampling interval may be implemented in the above approximation schemes. The adaptive gain controller may be implemented using the forward or backward difference approximation for the "integral" gain.

Figure 2:
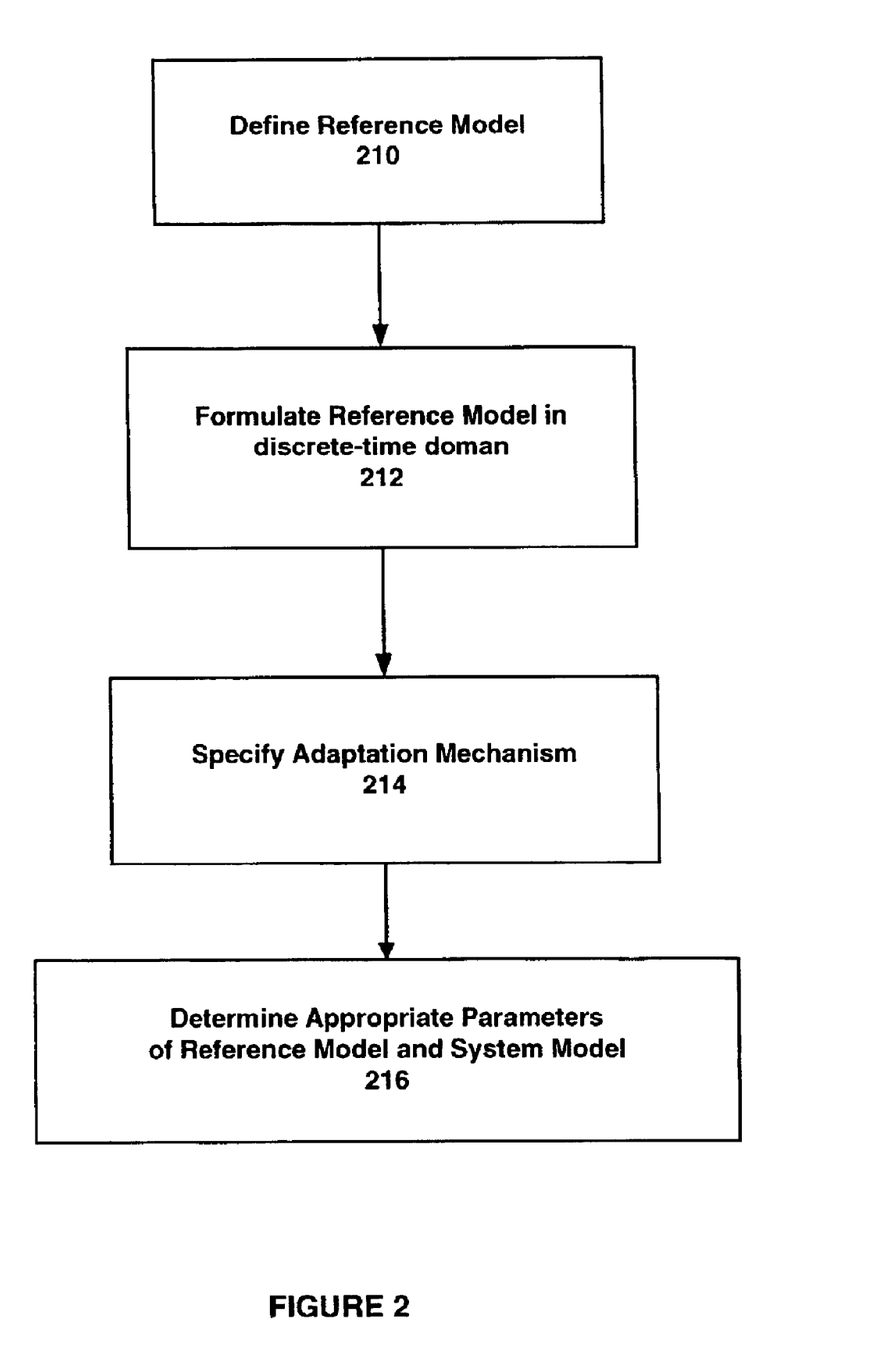
FIG. 2 is a flowchart illustrating steps for obtaining data used in an adaptive gain control algorithm in accordance with the present invention.

FIG. 2 is a flowchart illustrating steps for obtaining data used in an adaptive gain control algorithm in accordance with an embodiment of the present invention. The proposed controller of the present invention may be applicable to processes with time-varying parameters and to processes with non-linearities. In addition, explicit mathematical modeling of the process is not required. Further, the adaptive controller of the present invention is easily configurable for different processes.

At step 210, a reference model (e.g., a 1st-order low-pass filter with single pole) may be defined for indicating how a process output should ideally respond to a command signal. At step 212, the reference model may be formulated in a discrete-time domain using a backward difference formula or other formula. At step 214, an adaptation mechanism may be specified for stabilizing the system and minimizing error. At step 216, appropriate parameters of the reference model and system model, such as a time constant and a system sampling interval, may be determined.

Figure 3:
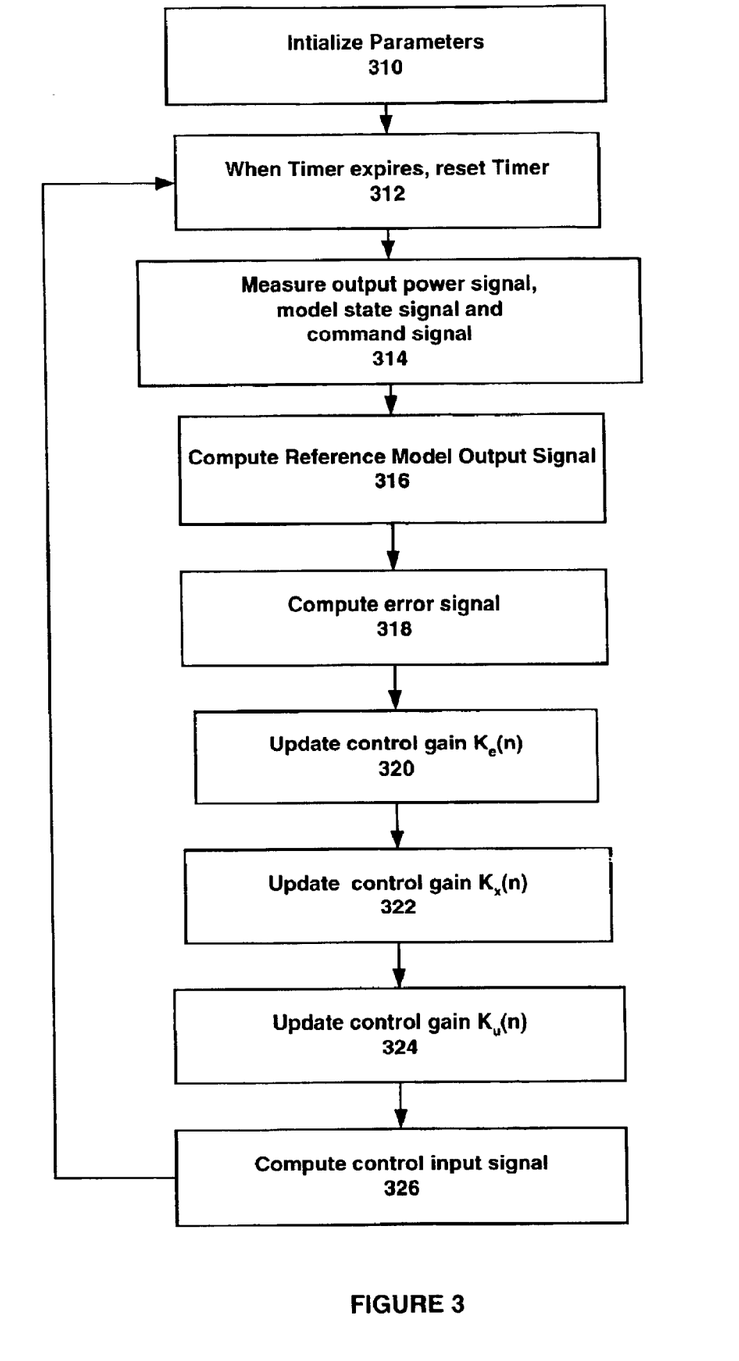
FIG. 3 is a flowchart illustrating an adaptive gain control algorithm in accordance with the present invention.

FIG. 3 is a flowchart illustrating an adaptive gain control algorithm in accordance with an embodiment of the present invention. At step 310, parameters may be initialized. For example, a timer may be initialized to $t_s$ indicating first discrete time interval, n=0; control parameters may be initialized where $\Phi_l 0$; $\Phi_p \geq 0$; and $\sigma \geq 0$; control gains may be initialized, and a control input $u_p(0)$ may be initialized. At step 312, when the timer expires, the timer may be reset to $t_s$ indicating an advancement to a next discrete time interval n=n+1. At step 314, measurements of an output power signal $y_p(n)$, a model state signal $x_m(n)$ and a command signal $u_m(n)$ may be taken. At step 316, a reference model output signal $y_m(n)$ may be computed where $y_m(n)=C_m x_m(n)$. At step 318, an error signal may be computed where $e(n)=y_m(n)-y_p(n)$. At step 320, control gain $K_e(n)$ may be updated where $K_{pe}(n)=\Phi_p e^2(n)$;

$$K_{le}(n) = \frac{1}{(1+\sigma t_s)}$$

$[K_{le}(n-1)+t_s\Phi_l e^2(n)]$; and $K_e(n)=K_{pe}(n)+K_{le}(n)$. At step 322, control gain $K_s(n)$ may be updated where $K_{px}(n)=\Phi_p e(n)x_m(n)$;

$$K_{lx}(n) = \frac{1}{(1+\sigma t_s)}$$

$[K_{lx}(n-1)+t_s\Phi_l e(n)x_m(n)]$; and $K_r(n)=K_{px}(n)+K_{lx}(n)$. At step 324, control gain $K_u(n)$ may be updated where $K_{up}(n)=\Phi_p e(n)u_m(n)$;

$$K_{lu}(n) = \frac{1}{(1+\sigma t_s)}$$

$[K_{lu}(n-1)+t_r\Phi_l e(n)u_m(n)]$; and $K_u(n)=K_{pu}(n)+K_{lu}(n)$. At step 326, control input $u_p(n)$ may be computed as $u_p(n)=K_e(n)e(n)+K_x(n)x_m(n)+K_u(n)u_m(n)$.

Figure 4:
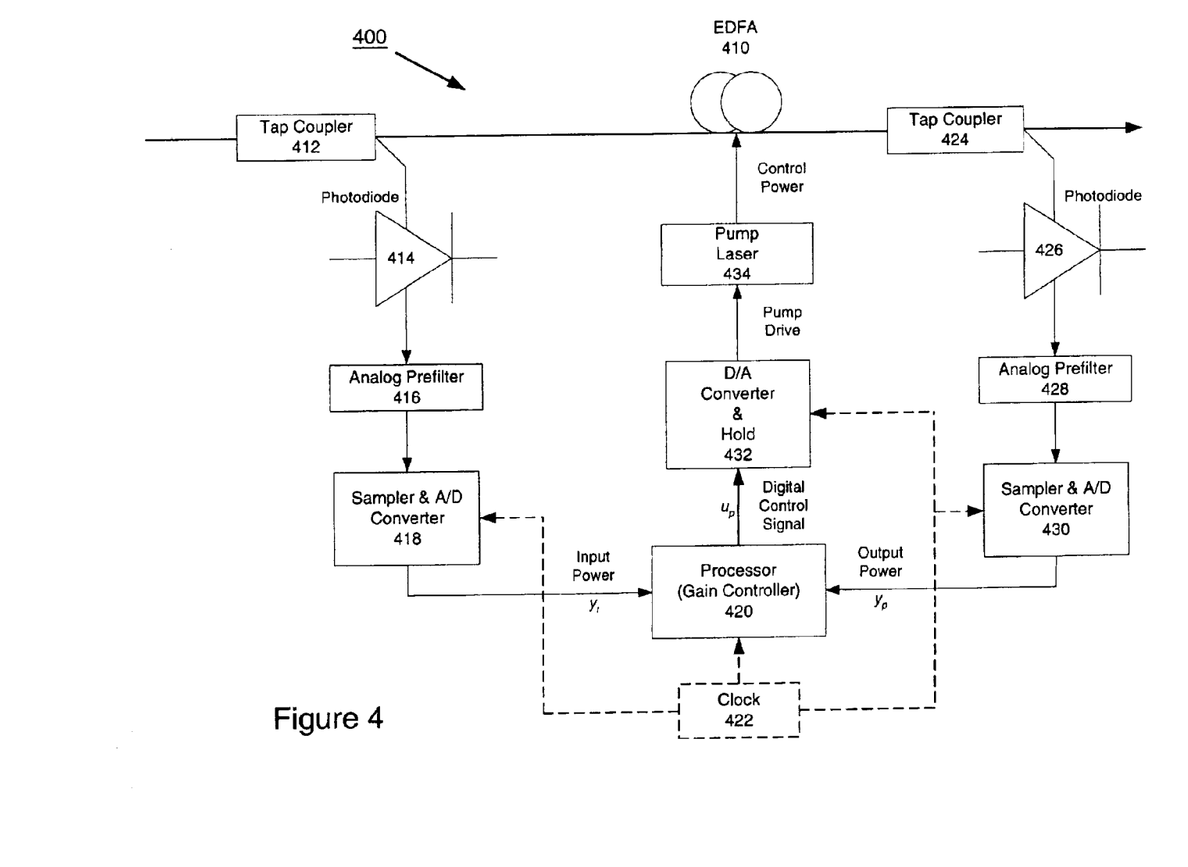
FIG. 4 is a high-level diagram of a digital implementation of an AGC of an EDFA in accordance with the present invention.

FIG. 4 is a high-level diagram of a digital implementation of an AGC of an EDFA in accordance with an embodiment of the present invention. System 400 may include an EDFA 410 with a tap coupler 412 at an input and a tap coupler 424 at an output. Photodiode 414 may receive an input from tap coupler 412 and generate an output to be received by Analog Pre-Filter 416. Sampler and A/D converter 418 may receive an input from Analog Pre-filter 416 and generate an input power signal $y_i$ to be received by processor 420. At an output end of EDFA 410, photodiode 426 may receive an input from tap coupler 424 and generate an output to be received by Analog Pre-Filter 428. Sampler and A/D converter 430 may receive an input from Analog Pre-Filter 428 and generate an output power signal $y_p$ to be received by processor 420. Processor 420 may generate a digital control signal $u_p$ which is received by D/A converter & hold 432. Processor 420 may include a digital signal processor (DSP) or other processor for running a control algorithm (e.g., adaptive gain control algorithm). D/A converter & hold 432 may generate a pump drive for driving pump laser 434. Pump laser 434 may generate control power for adaptively controlling EDFA 410. Clock 422 may control a sampling process of 418 and 430 as well as D/A Converter and Hold 432.

A process, which may include pump laser 434 and EDFA 410, represents a continuous-time physical system to be controlled. The input which may include a pump laser drive and the output of the process (e.g., EDFA output power) may be continuous signals. The A/D converters within 418, 430 convert the analog signals (e.g., EDFA input and output powers) of the process into a finite precision digital number depending on how many bits or levels that are used in the conversion. The conversion may also be quantized in time determined by clock 422, which determines a sampling process. Activities in system 400 may be controlled by clock 422 where most or all computations are performed within a given time. A sampler is a device, driven by clock 422 in system 400, that converts a continuous-time signal into a sequence of numbers. Normally, a sampler is combined into the A/D converter as illustrated by 418 and 430, which also quantizes the sequence of numbers into finite precision number that may then be used by processor 420. For example, A/D converter may have 8–16 bits resolution giving $2^8$–$2^{16}$ levels of quantization.

The control algorithm thus receives data that may be quantized both in time and in level. The control algorithm transforms the measurements into a desired control signal, as represented by $u_p$. The control signal $u_p$ may be transferred to D/A converter within 432, which with finite precision converts the number in the processor 420 into a continuous-time signal (e.g., a pump laser drive). This implies that the D/A converter of 432 may contain both a conversion circuit and a hold circuit that translates a number into a physical variable that may be applied to the process (e.g., pump laser 434 and EDFA 410). The hold circuit within 432 determines an input to the process until a new number is delivered from processor 420. The hold circuit within 432 may be a zero-order-hold, which holds the input constant over the sampling period or other type of hold device, such as a first-order-hold, where the input is computed from current and previous outputs from the processor using a first order polynomial in time. D/A converter(s) within 432 may be constructed such that an output is constant until a new conversion is ordered.

Sampling instants represent times when a measured physical variable (e.g., EDFA input and output powers) are converted into digital form. The time between two sampling instants is a sampling period, $t_s$ where $1/t_s$ is a sampling rate. Periodic sampling may be normally used, implying that the sampling period is constant, e.g., the output is measured and the control signal is applied each $t_s$th time unit.

The faster the sampling rate, (the smaller the sampling period $t_s$), the better the discretized signal approximates a real continuous signal. However, it is uneconomical to sample too fast, as the computing and memory hardware may become too expensive. When selecting an appropriate sampling interval, various factors may be considered, such as a maximum frequency of interest in the signal; a sampling theorem which specifies a lower limit on the sampling rate to resolve any particular frequency unambiguously; any analog filtering that may be required for reducing aliasing; and cost of hardware and speed of A/D converters. Because A/D and D/A conversions and control law calculations (e.g., computational load on the processor) take time, there will generally be a delay between the measurement and the time the control signal is applied to the process.

To recover a signal from its samples, the signal may be sampled at least two times a period, or alternatively sampled at a rate twice a highest frequency of interest in the signal. Alternatively, the highest frequency that may be reconstructed for a given sampling rate, $1/t_s$, may be one half of this, or $\frac{1}{2}t_s$. This is called the Nyquist frequency $f_N = \frac{1}{2}t_s$. If the signal contains no frequencies above $f_N$ then the continuous-time signal may be uniquely reconstructed from a periodically sampled sequence provided the sampling frequency is higher than $2f_N$.

It is also important to understand the level of measurement noise and frequency content. Measurement noise represents disturbances that distort the information about the process variables obtained from the sensors. If the noise level is high, it might be necessary to filter the measurement signal before it enters the control algorithm. If a continuous-time signal is sampled with frequencies above the Nyquist frequency, these frequencies will be "folded" down into lower frequencies. The phenomenon that a high frequency signal will be interpreted as a low frequency signal when sampled may be referred to as aliasing or frequency folding.

The aliasing effect may create significant control difficulties if proper precautions are not taken. High frequencies, which in analog controllers normally are effectively eliminated by low-pass filtering may, because of aliasing, appear as low frequency signals in the bandwidth of the sampled control system.

The implication of the aliasing is that frequencies above the Nyquist frequency should be removed before sampling. A way of doing this is to use an analog filter before sampling the signal. An analog pre-filter (which may effectively eliminate signal components with frequencies above half the sampling frequency) may be introduced. These types of filters are called anti-aliasing filters.

The bandwidth of the filter may be such that attenuation above the Nyquist frequency is sufficiently high. Bessel filter's of order 2–6, for example, may be sufficient to eliminate most of the influence of higher frequencies. Other filters such as Butterworth or ITAE (Integral of Time multiplied by Absolute Error) may also be implemented.

The selection of the filter bandwidth may be illustrated by the following example. A pre-filter may attenuate signals by a factor of 16 at half the sampling frequency. If the filter bandwidth is $\omega_b$ and the sampling frequency is $\omega_s$, then $(\omega_s/2\omega_b)^2 = 16$ where $$\omega_b = \frac{1}{8}\omega_s.$$

EDFAs are generally sensitive to transient cross-saturation induced by random signal bursts and signal add/drops under network faults or system reconfiguration. The surviving channels, as a result may fluctuate in response to these changes. Such channel power fluctuations may lead to serious system penalties due to increased channel bit error rates. In order to avoid gain fluctuations from transient power excursions, it is necessary to dynamically control EDFAs through a control scheme. The present invention provides an adaptive control scheme for dynamic gain control of EDFAs. The controller is simple to implement and does not require explicit knowledge of the EDFA process model parameters. According to an embodiment of the present invention, the controller adequately controls transients in an EDFA (and other amplifier structure).

At this point it should be noted that adaptively controlling gain in an optical amplifier in accordance with the present invention as described above typically involves the processing of input data and the generation of output data to some extent. This input data processing and output data generation may be implemented in hardware or software. For example, specific electronic components may be employed in a controller or similar or related circuitry for implementing the functions associated with adaptively controlling gain in an optical amplifier in accordance with the present invention as described above. Alternatively, one or more processors operating in accordance with stored instructions may implement the functions associated adaptively controlling gain in an optical amplifier in accordance with the present invention as described above. If such is the case, it is within the scope of the present invention that such instructions may be stored on one or more processor readable media, or transmitted to one or more processors via one or more signals.

The present invention is not to be limited in scope by the specific embodiments described herein. Indeed, various modifications of the present invention, in addition to those described herein, will be apparent to those of ordinary skill in the art from the foregoing description and accompanying drawings. Thus, such modifications are intended to fall within the scope of the following appended claims. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes. Accordingly, the claims set forth below should be construed in view of the full breath and spirit of the present invention as disclosed herein.

What is claimed is:

1. A method for adaptively controlling a gain of an optical amplifier, the method comprising the steps of:
    measuring an output power signal of the optical amplifier;
    computing a command signal from an input power signal;
    computing a model state signal of a reference model;
    computing a model output signal of the reference model based at least in part on the model state signal;
    computing an error signal between the model output signal and the output power signal of the optical amplifier;
    adjusting at least one adaptive, control gain value to minimize the error signal; and
    computing a control input signal for driving the optical amplifier based at least in part on the at least one adaptive control gain value, the error signal, the model state signal and the command signal.

2. The method of claim 1, wherein the reference model is a low pass filter.

3. The method of claim 1, wherein the command signal comprises a product of an input power signal and a target gain plus a bias signal.

4. The method of claim 1, wherein the command signal comprises a product of a target gain and a sum of the input power signal and a bias signal.

5. The method of claim 1, wherein the optical amplifier comprises a pump laser and an erbium-doped fiber.

6. The method of claim 1, wherein the at least one adaptive control gain value comprises a first gain value associated with the error signal, a second gain value associated with the model state signal and a third gain value associated with the command signal.

7. The method of claim 6, wherein each adaptive control gain value comprises an integral component and a proportional component.

8. The method of claim 1, wherein the control input signal comprises a first product of a first adaptive control gain value and the error signal, a second product of a second adaptive control gain value and the model state signal; and a third product of a third adaptive control gain value and the command signal.

9. A computer signal embodied in a carrier wave readable by a computing system and encoding a computer program of instructions for executing a computer process performing the method recited in claim 1.

10. A system for adaptively controlling a gain of an optical amplifier, the system comprising:
    a reference model for generating a model output signal based at least in part on a model state signal;
    a first summer for computing an error signal between the model output signal and an output power signal from the optical amplifier;
    an adaptation mechanism for adjusting at least one adaptive control gain value to minimize the error signal; and
    a second summer for computing a control input signal for driving the optical amplifier based at least in part on the at least one adaptive control gain value, the error signal, the model state signal and a command signal computed from an input power signal.

11. The system of claim 10, wherein the reference model is a low pass filter.

12. The system of claim 10, wherein the command signal comprises a product of an input power signal and a target gain plus a bias signal.

13. The system of claim 10, wherein the command signal comprises a product of a target gain and a sum of the input power signal and a bias signal.

14. The system of claim 10, wherein the optical amplifier comprises a pump laser and an erbium-doped fiber.

15. The system of claim 10, wherein the at least one adaptive control gain value comprises a first gain value associated with the error signal, a second gain value associated with the model state signal and a third gain value associated with the command signal.

16. The system of claim 15, wherein each adaptive control gain value comprises an integral component and a proportional component.

17. The system of claim 10, wherein the control input signal comprises a first product of a first adaptive control gain value and the error signal, a second product of a second adaptive control gain value and the model state signal; and a third product of a third adaptive control gain value and the command signal.

18. An article of manufacture for adaptively controlling a gain of an optical amplifier, the article of manufacture comprising:
    at least one processor readable carrier; and
    instructions carried on the at least one carrier;
    wherein the instructions are configured to be readable from the at least one carrier by at least one processor and thereby cause the at least one processor to operate so as to:
    measure an output power signal of the optical amplifier;
    compute a command signal from an input power signal;
    compute a model state signal of a reference model;
    compute a model output signal of the reference model based at least in part on the model state signal;
    compute an error signal between the model output signal and the output power signal of the optical amplifier;
    adjust at least one adaptive control gain value to minimize the error signal; and
    compute a control input signal for driving the optical amplifier based at least in part on the at least one adaptive control gain value, the error signal, the model state signal and the command signal.

19. The article of manufacturing of claim 18, wherein the optical amplifier comprises a pump laser and an erbium-doped fiber.

20. The article of manufacturing of claim 18, wherein the at least one adaptive control gain value comprises a first gain value associated with the error signal, a second gain value associated with the model state signal and a third gain value associated with the command signal.

* * * * *